Figures 1, 2:
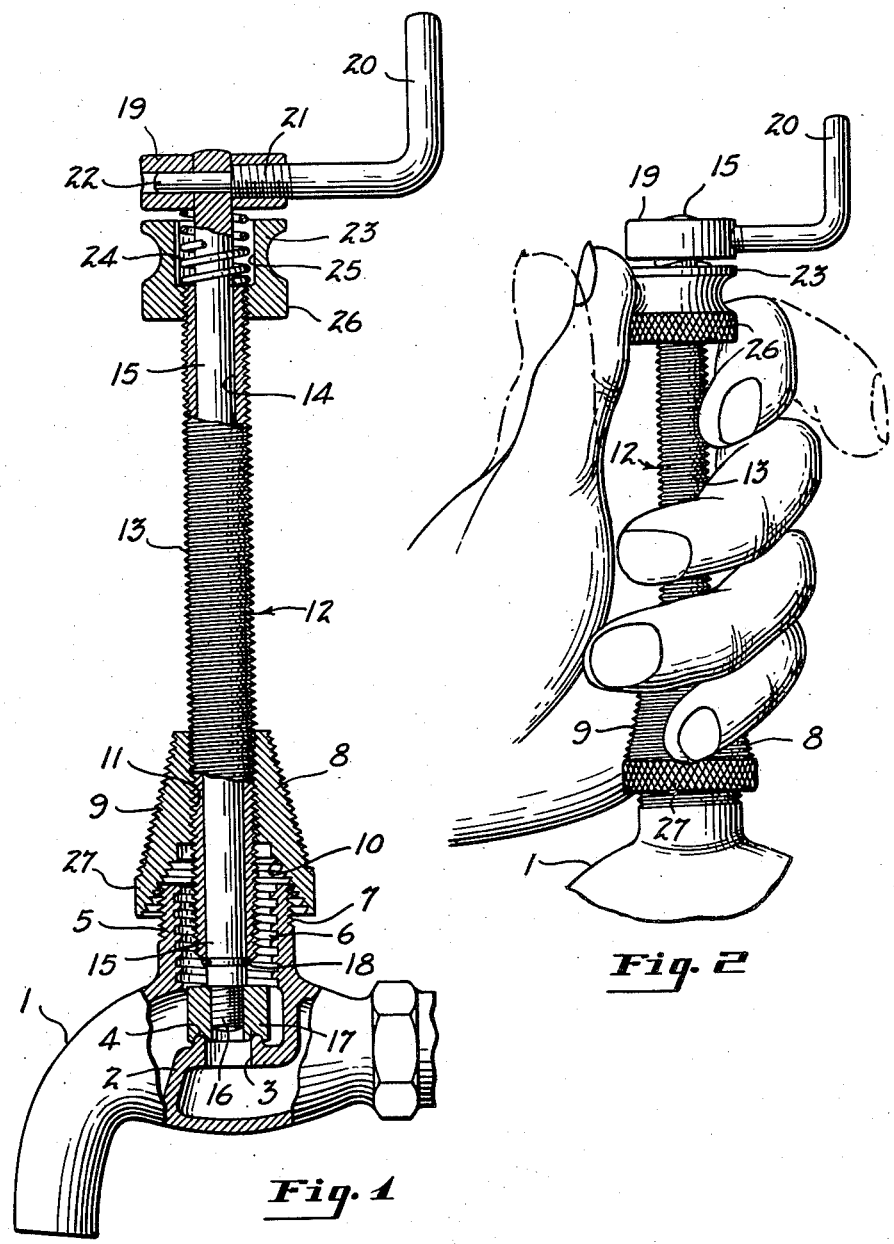

April 15, 1958     C. F. SCHULTIS     2,830,500
VALVE SEATING TOOL

Filed Oct. 29, 1953

INVENTOR
Charles F. Schultis
BY Evans + McCoy
ATTORNEYS

United States Patent Office 2,830,500
Patented Apr. 15, 1958

2,830,500

VALVE SEATING TOOL

Charles F. Schultis, Lakewood, Ohio, assignor to Henry Herzog, Cleveland, Ohio

Application October 29, 1953, Serial No. 388,970

3 Claims. (Cl. 90—12.5)

This invention relates to tools for repairing faucet seats and other valve seats in casings which have openings opposite the valve seat through which access may be had thereto.

It is common practice to resurface the valve seats of household water faucets when they become scored or grooved to such an extent that there is a continuous leakage past the face of the washer engaging the seat.

The tool of the present invention is designed for use in such a valve resurfacing operation and comprises an externally threaded cylindrical tube, an internally threaded adaptor into which the tube is screwed for alining the tube with the valve seat, and a spindle journaled in the tube and carrying a tool for resurfacing the valve seat or for otherwise machining the valve. A handle is provided on the spindle and a friction slip driving connection is provided between the spindle and the tube so that rotation of the handle causes rotation of both the spindle and the tube, the screwing of the tube into the adaptor due to the rotation of the tube advancing the tool axially. However, this friction drive may be easily overcome by gripping a thumbpiece or other hand grip on the tube to prevent rotation of the tube. It is preferable to provide a friction driving connection with a relatively weak spring so that the friction produced by the slip connection during rotation of the spindle is only slightly greater than the friction produced by the threads of the adaptor due to rotation of the tube with respect to the adaptor whereby a light manual pressure on the tube is sufficient to stop rotation of the tube. A steady feed pressure will be maintained on the tool due to the torsional thrust of the friction driving connection which tends to screw the tube into the adaptor, and it is desirable to manually hold the tube against rotation to prevent advancement of the tool during the final portion of the reseating operation. A small thumbpiece may be provided on the tube for this purpose. By the use of a hand crank to turn the spindle and a thumbpiece to prevent movement of the tool toward the valve seat, the cutter may easily be rotated by one hand while the tube is held against rotation by the other hand to arrest its feed so as to impart a smooth surface to the valve seat.

Objects of the invention are to provide a simple and inexpensive valve resurfacing tool that can be quickly and easily mounted on a faucet and adjusted to cutting position and to provide a hand tool in which the cutter is automatically fed toward the valve seat upon rotation of the cutter, in which a steady feed pressure is applied to the cutter after engagement with the seat, and in which the feed of the cutter may be instantly stopped at any time to form a smooth surface on the seat.

With the above and other objects in view, the invention may be said to comprise the tool as illustrated in the accompanying drawings and hereinafter described, together with such variations and modifications thereof as will be apparent to one skilled in the art to which the invention pertains.

Reference should be had to the accompanying drawings forming a part of this specification, in which:

Figure 1 is a vertical sectional view showing the tool of the present invention mounted on a water faucet and having a seat resurfacing element on the tool spindle; and Figure 2 is a fragmentary side elevational view showing how the tool may be held in the hand during the resurfacing operation.

In Fig. 1 of the drawings the tool of the present invention is shown applied to a water faucet 1 having an internal closure wall or partition 2 provided with a valve opening 3, and with an annular valve seat 4 surrounding the opening. The faucet 1 has a tubular extension 5 that is internally cylindrical to provide an opening axially alined with the valve seat, the extension 5 having coarse internal threads 6 for engagement with valve stem threads and fine external threads 7 upon which a valve retaining cap may be screwed.

The tool of the present invention is mounted upon the faucet 1 by means of an annular adaptor 8 which has an external conical threaded surface 9 and an internal conical threaded surface 10. The adapter may be positioned on a faucet such as shown in Fig. 1 by engagement of the internal threads 10 with the external threads 7 and where the valve casing is provided with fine internal screw threads the adaptor may be reversely positioned with respect to the tool with its external threads in engagement with the internal threads of the faucet as is well understood in the art. The adaptor 8 has an internal cylindrical threaded surface 11 that is coaxial with the threaded surfaces 9 and 10 and that is in axial alinement with the valve seat of the faucet when the adaptor 8 is secured in place on the valve receiving portion of the faucet.

A cylindrical tube 12 has external threads 13 which permit screwing of the tube into and out of the adaptor 8 and has an axial cylindrical bore 14 in which a tool spindle 15 is journaled. The spindle has a tool receiving portion projecting below the lower end of the tube 12 and has an externally threaded lower end 16 of reduced diameter that is adapted to be screwed into various tools such as a milling cutter 17 which are suitable for resurfacing the valve seat. A split metal ring 18 provided in an annular groove located adjacent the bottom of the tube 12 serves as stop means to limit movement of the spindle 15 and the tool carried thereby toward the tube.

Movement of the spindle in the opposite direction is limited by a detachable annular collar 19 which is connected to a handle receiving portion of the spindle 15 projecting above the upper end of the tube 12, the upper surface of the collar being located near or substantially flush with the top surface of the spindle, the collar preferably serving as a handle to rotate the spindle. A hand crank 20 is carried by the collar 19 to drive the spindle and to rotate the cutter carried thereby. The crank comprises an L-shaped rod having a threaded portion 21 that is adapted to be screwed into a hole tapped in the collar 19 and having a portion 22 of reduced diameter that slidingly fits in holes drilled through the collar 19 and the spindle 15 and that serves as a driving pin to key the collar to the spindle.

Any suitable friction slip driving connection may be provided between the tube 12 and the spindle 15 to impart rotation of the tube when the hand crank 20 is rotated. As herein shown the driving connection comprises an annular sleeve 23 rigidly attached to the upper end of the tube 12 and extending axially above the tube and a coil spring 24 surrounding the tool spindle 15 and compressed between the tube 12 and the collar 19. The compressed spring 24 is located in a cylindrical socket 25 and frictionally engages the bottom of the collar 19 and the bottom of the socket 25 which may be formed in part by the upper end of the tube 12 so as to provide a friction drive adapted to rotate the tube with respect to the adaptor so as to advance the cutter, the friction created by the spring 24 of the friction slip driving connection being normally greater than the friction created by the threads 11 and 13 of the adaptor and the tube, respectively.

Suitable means such as a handgrip is provided selectively to prevent rotation of the tube 12 and to cause slippage of the friction slip driving connection during rotation of the hand crank 20 and the tool spindle so that the axial feed of the cutter may be stopped when desired and the cutter may be driven after its axial feed has been arrested. The rotation preventing handgrip or handle is preferably adapted to be held by the hand of an operator while the same hand grasps the tool to steady the same during rotation of the hand crank and the tool spindle by the other hand. As herein shown, the sleeve 23 provides the handgrip, is screwed on the tube 12, and is soldered or otherwise fixed thereto for rotation therewith, the lower end of the sleeve having a diameter greater than 2½ times the diameter of the tube 12 and having a knurled surface 26 serving as a thumbpiece or handgrip to stop rotation of the tube 12 when it is desired to stop the axial feed of the cutter.

When it is desired to resurface a valve seat, the adaptor 8 is rotated on the tube 12 to properly position the cutter with respect to the adaptor and the adaptor is then secured in place on the valve receiving portion of the faucet. If it is necessary to reverse the adaptor on the tube before securing the same to the faucet, the collar 19 may be removed by unscrewing the hand crank 20 to permit axial sliding of the spindle 15 out of the bore of the tube 12, and the adaptor may be unscrewed from the tube and reversed. To facilitate rotation of the adaptor 8 on the tube 12, the adaptor may have a knurled surface 27 providing a handgrip.

After the adaptor has been secured to the faucet, the hand crank 20 may be rotated whereby the friction slip driving connection rotates the tube 12 and the collar 19 to feed the cutter axially toward the valve seat. The axial feed of the cutter may easily be interrupted during the operation of the tool by grasping the knurled surface of the sleeve 23 with one hand as shown in solid lines in Fig. 2. The tool may then be steadied by holding the tube 12 with one hand as the hand crank is rotated with the other hand whereby the cutter is driven without being advanced axially. By releasing the grip of the hand on the sleeve 23 and the tube 12 as shown in dotted lines in Fig. 2 while the spindle is driven, the axial feed of the cutter is resumed.

While various amounts of friction may be provided by the friction slip driving connection, it is preferable to provide only slightly more friction than is required to overcome the opposing friction created at the adaptor 8 by the threads 11 engaging the threads 13. During operation of the tool a light feed pressure is maintained on the cutter due to the torque on the tube 12 exerted by the friction slip driving connection and the feeding of the cutter may be stopped at any time when the sleeve 23 is gripped by the hand. With a tool designed to function in this manner, the rotation of the tube 12 may usually be stopped merely by gripping the threads 13 of the tube with the hand without grasping the sleeve 23.

A tool of the type described above may be used with various types of cutting tools for drilling, milling, reaming, tapping or otherwise resurfacing parts of a valve.

It is to be understood that, in accordance with the provisions of the patent statutes, variations and modifications of the specific devices herein disclosed may be made without departing from the spirit of the invention.

What I claim is:

1. A tool for use in repairing a valve seat in a casing provided with an opening alined with the seat comprising an externally threaded tube, an adaptor having an opening that is internally threaded to receive said tube and having portions engageable with the valve casing for axially alining said tube with the valve seat, a spindle journaled in said tube and having a tool receiving portion projecting beyond an end of said tube, a milling cutter mounted on said tool-receiving portion, a handle operably connected to the opposite end of said spindle for manually rotating the spindle, a rigid stop member located between said tool receiving portion and said tube to limit axial movement of said tool receiving portion toward said tube, and means including a helical spring on said spindle engaging the top end of said tube for yieldably holding said stop member in engagement with the bottom end of said tube and providing friction slip driving connection between said tube and said spindle for creating a torque sufficient to overcome the friction created by the engaging threads of said tube and said adaptor when said spindle is rotated, said torque tending to transmit rotation from the spindle to the tube so as to move the tube and the spindle axially with respect to the adaptor but being relatively light so that said tube may be held manually against rotation during rotation of said spindle to cause slippage of said friction slip driving connection and to discontinue the axial movement of said spindle.

2. A tool for use in repairing a valve seat in a casing provided with an opening alined with the seat comprising an externally threaded tube, an adaptor having an opening that is internally threaded to receive said tube and having portions engageable with the valve casing to aline said tube with the valve seat, a spindle journaled in said tube and having a tool receiving portion projecting beyond an end of said tube, a milling cutter mounted on said tool-receiving portion, a handle operably connected to the opposite end of said spindle for manually rotating the spindle, a rigid stop member located between said tool receiving portion and said tube to limit axial movement of said tool receiving portion toward said tube, and means providing a spring-loaded friction slip driving connection for transmitting rotation from said spindle to said tube, said driving connection providing a light torque in response to rotation of said spindle but slightly greater than that necessary to overcome the friction caused by the engaging threads of said tube and said adaptor, a portion of said tube between said adapter and said opposite end providing a handgrip for overcoming said torque to retard rotation of said tube caused by said driving connection.

3. A tool for use in repairing a valve seat in a casing provided with an opening alined with the seat comprising an externally threaded tube, a generally frusto-conical adaptor having a generally cylindrical opening that is internally threaded to receive said tube and having tapered portions engageable with the valve casing to aline said tube with the valve seat, a spindle journaled in said tube and having a tool receiving portion projecting downwardly beyond the bottom end of said tube, a milling cutter mounted on said tool-receiving portion, a handle operably connected to the top end of said spindle for rotating the spindle, stop means at the bottom end of said tube interposed between said tube and said spindle to limit upward axial movement of said tool receiving portion toward said tube, means providing a spring-loaded friction slip driving connection at the top of said tube interposed between said tube and said spindle for transmitting rotary movement from said spindle to said tube so as to move the tube and the spindle axially with respect to said adaptor, and a thumbpiece carried by the top portion of said tube, said driving connection providing torque but slightly greater than that necessary to overcome the friction caused by the engagement of said tube with said adaptor so that said tube may be manually held against rotation by said thumbpiece while a person's hand is gripping the tube to steady the tool.

(References on following page)

References Cited in the file of this patent

UNITED STATES PATENTS

| Number | Name | Date |
|---|---|---|
| 1,662,445 | Troha | Mar. 13, 1928 |
| 1,765,968 | Davey | June 24, 1930 |
| 1,993,479 | Hawker | Mar. 5, 1935 |
| 2,082,461 | Pardieck | June 1, 1937 |
| 2,480,058 | Stetzel | Aug. 23, 1949 |
| 2,573,790 | Herzog | Nov. 6, 1951 |

FOREIGN PATENTS

| Number | Country | Date |
|---|---|---|
| 57,407 | France | Nov. 5, 1952 |
| 266,008 | Germany | Oct. 17, 1913 |